US011175058B2

(12) United States Patent
Okazaki

(10) Patent No.: US 11,175,058 B2
(45) Date of Patent: Nov. 16, 2021

(54) AIR CLEANER AND NETWORK SYSTEM

(71) Applicant: SHARP KABUSHIKI KAISHA, Sakai (JP)

(72) Inventor: Akihiro Okazaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 197 days.

(21) Appl. No.: 16/607,606

(22) PCT Filed: Dec. 28, 2017

(86) PCT No.: PCT/JP2017/047328
§ 371 (c)(1),
(2) Date: Oct. 23, 2019

(87) PCT Pub. No.: WO2019/058569
PCT Pub. Date: Mar. 28, 2019

(65) Prior Publication Data
US 2020/0080737 A1 Mar. 12, 2020

(30) Foreign Application Priority Data

Sep. 20, 2017 (JP) .............................. JP2017-180199

(51) Int. Cl.
| F24F 11/30 | (2018.01) |
| F24F 11/62 | (2018.01) |
| F24F 11/58 | (2018.01) |
| G05B 19/042 | (2006.01) |
| H04L 29/08 | (2006.01) |
(Continued)

(52) U.S. Cl.
CPC .............. *F24F 11/30* (2018.01); *F24F 11/58* (2018.01); *F24F 11/62* (2018.01); *G05B 19/042* (2013.01); *H04L 67/12* (2013.01); *F24F 2110/50* (2018.01); *F24F 2110/65* (2018.01); *G05B 2219/2614* (2013.01)

(58) Field of Classification Search
CPC .. F24F 11/30; F24F 11/57; F24F 11/58; F24F 11/62; F24F 2110/50; F24F 2110/65; F24F 3/16; G05B 19/042; G05B 2219/2614; G06F 13/00; H04L 67/12
See application file for complete search history.

(56) References Cited

U.S. PATENT DOCUMENTS

2011/0029685 A1* 2/2011 Itai ....................... G03F 7/70525
709/233
2016/0182704 A1* 6/2016 Minezawa ........ H04M 1/72415
455/420
(Continued)

FOREIGN PATENT DOCUMENTS

| CN | 104075422 A | 10/2014 |
| CN | 106663084 A | 5/2017 |
(Continued)

*Primary Examiner* — Kidest Bahta
(74) *Attorney, Agent, or Firm* — ScienBiziP, P.C.

(57) ABSTRACT

Provided herein is an air cleaner (200) that includes: a communication interface (260) that receives information concerning operation contents from a server (100); and a processor (210) that, upon partial or complete termination of communication with the server (100), initializes the information concerning operation contents, or initializes a setting concerning acquisition of the information concerning operation contents.

10 Claims, 24 Drawing Sheets

(51) Int. Cl.
    *F24F 1/58*     (2011.01)
    *F24F 110/50*     (2018.01)
    *F24F 110/65*     (2018.01)

(56)     References Cited

U.S. PATENT DOCUMENTS

| | | |
|---|---|---|
| 2016/0269236 A1 | 9/2016 | Chan et al. |
| 2018/0195752 A1 | 7/2018 | Sasaki et al. |
| 2018/0372365 A1 | 12/2018 | Nagasaka |
| 2019/0024929 A1 | 1/2019 | Funada et al. |
| 2019/0116089 A1 | 4/2019 | Chan et al. |

FOREIGN PATENT DOCUMENTS

| | | |
|---|---|---|
| JP | 2007-127399 A | 5/2007 |
| JP | 2010-112678 A | 5/2010 |
| JP | 2010-157942 A | 7/2010 |
| JP | 2011-004042 A | 1/2011 |
| JP | 2017-067427 A | 4/2017 |
| JP | 2017-151742 A | 8/2017 |
| JP | 2017-220918 A | 12/2017 |
| JP | 2018-042348 A | 3/2018 |
| WO | 2017/119158 A1 | 7/2017 |
| WO | 2017/159208 A1 | 9/2017 |

\* cited by examiner

FIG.3

| AIR CLEANER ID | USER NAME | COMMUNICATION TERMINAL ID | POSTAL CODE | ADDRESS | MODE RECOMMENDATION |
|---|---|---|---|---|---|
| 9876543 | AAA | 512345 | 530-0001 | ... | ON |
| 9876544 | BBB | 512355 | 512-3456 | ... | OFF |
| ... | ... | ... | ... | ... | ... |

| <OPERATION PATTERN> | OPERATION MODE | SENSITIVITY | | |
|---|---|---|---|---|
| | | DUST (HIGH) | DUST (LOW) | ODOR |
| I. OUTDOOR: HIGH-POLLEN (YELLOW SAND) OPERATION | TYPE I | HIGH | AIR CLEANER SETTING | AIR CLEANER SETTING |
| II. OUTDOOR: HIGH-PM2.5 (OUTDOOR) OPERATION | TYPE II | AIR CLEANER SETTING | HIGH | AIR CLEANER SETTING |
| III. OUTDOOR: LOW-TEMPERATURE AND HUMIDITY (DRY) OPERATION | TYPE III | AIR CLEANER SETTING | AIR CLEANER SETTING | AIR CLEANER SETTING |
| IV. OUTDOOR: HIGH-TEMPERATURE AND HUMIDITY (RAINY SEASON) OPERATION | TYPE IV | AIR CLEANER SETTING | AIR CLEANER SETTING | HIGH |
| V. INDOOR: LOW-DUST DIRT (HISTORY) OPERATION | RECOMMENDED | HIGH | HIGH | AIR CLEANER SETTING |
| VI. INDOOR: LOW-ODOR DIRT (HISTORY) OPERATION | RECOMMENDED | AIR CLEANER SETTING | AIR CLEANER SETTING | HIGH |

FIG.5

| <COMBINATION EXAMPLES> | | SENSITIVITY 123 | | |
|---|---|---|---|---|
| | OPERATION MODE | DUST (HIGH) | DUST (LOW) | ODOR |
| I+V | TYPE I | HIGH | HIGH | AIR CLEANER SETTING |
| I+VI | TYPE I | HIGH | HIGH | HIGH |
| IV+V | TYPE IV | HIGH | HIGH | HIGH |
| IV+VI | TYPE IV | AIR CLEANER SETTING | AIR CLEANER SETTING | HIGH |
| V+VI | RECOMMENDED | HIGH | HIGH | HIGH |
| NONE | RECOMMENDED | AIR CLEANER SETTING | AIR CLEANER SETTING | AIR CLEANER SETTING |

FIG.11
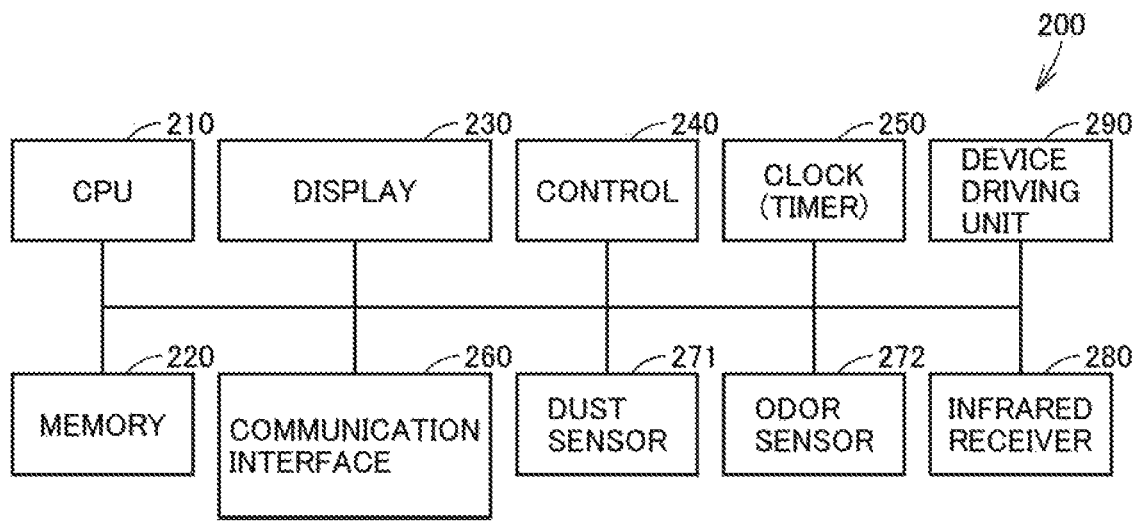
FIG.12
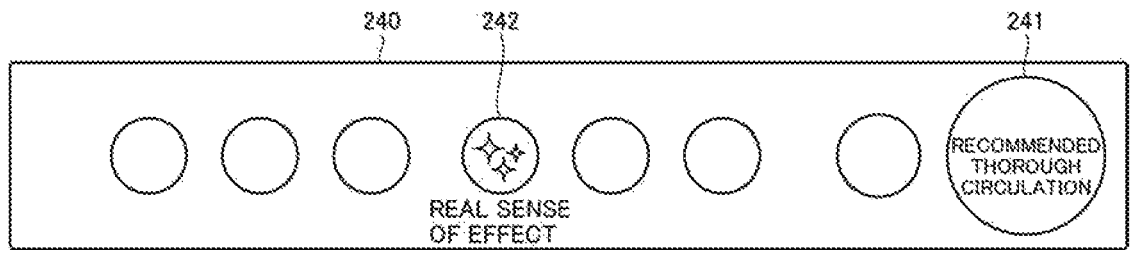
FIG.13

FIG.19

| AIR CLEANER ID | USER NAME | COMMUNICATION TERMINAL ID | POSTAL CODE | ADDRESS | REQUIRED PATTERN | MODE RECOMMENDATION |
|---|---|---|---|---|---|---|
| 9876543 | AAA | 512345 | 530-0001 | ... | ... | ON |
| 9876544 | BBB | 512355 | 512-3456 | ... | ... | OFF |
| ... | ... | ... | ... | ... | ... | ... |

121B

FIG.22
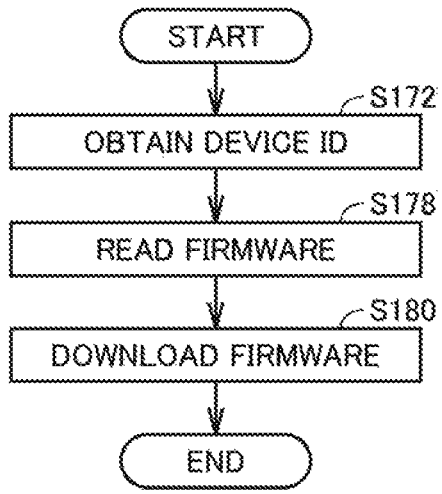
FIG.23
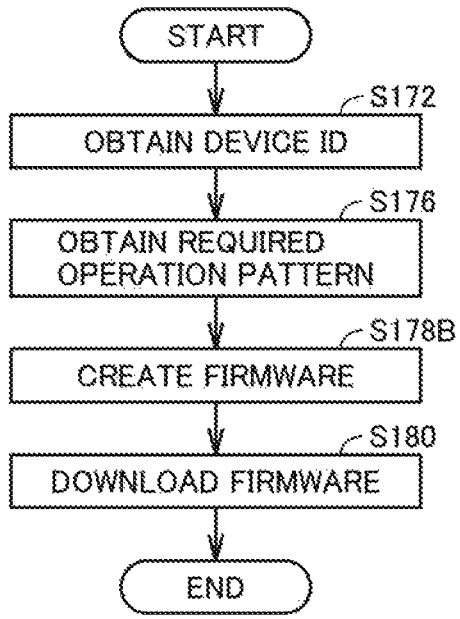
FIG.24
| OPERATION PATTERN ID | OPERATION PATTERN CONTENTS | REGIONAL INFORMATION |
|---|---|---|
| × | × | × |
| × | × | × |
| × | × | × |
124

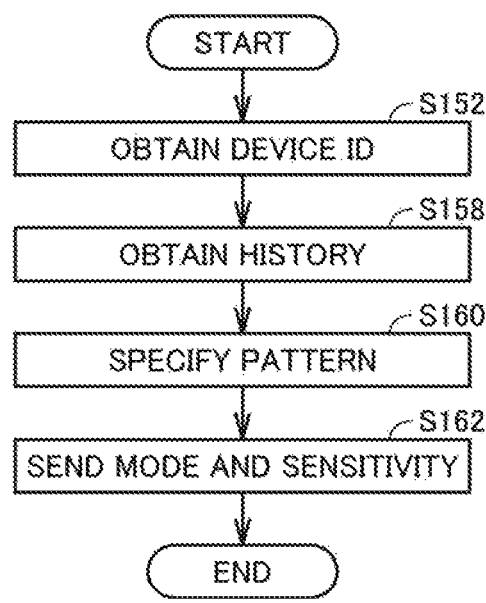

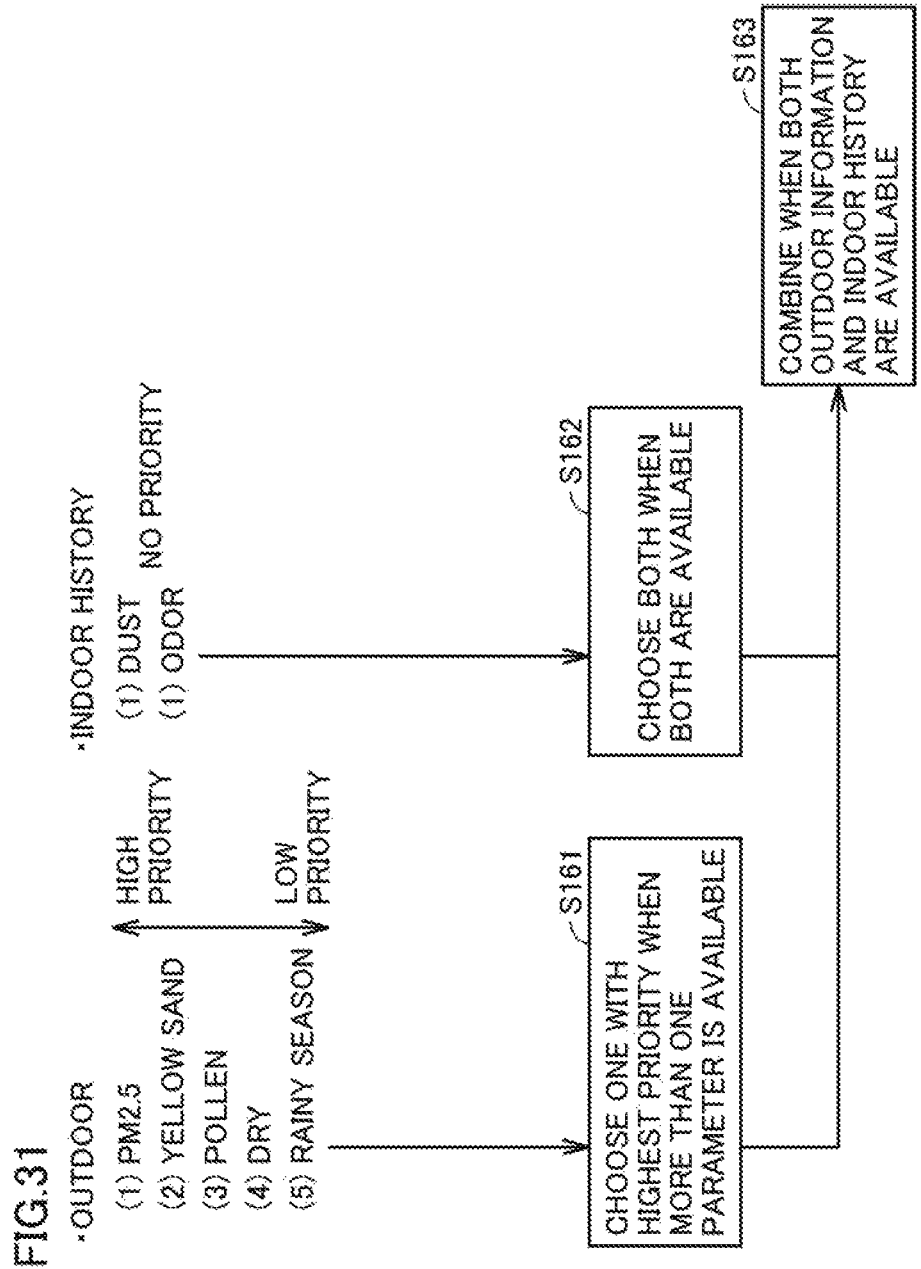

AIR CLEANER AND NETWORK SYSTEM

TECHNICAL FIELD

The present invention relates to an air cleaner technology, particularly to a technology related to an air cleaner connected to a network.

BACKGROUND ART

A technology for remote control of an air cleaner is known. For example, JP-A-2017-67427 (PTL 1) discloses an air conditioning control method, an air conditioning control device, and an air conditioning control program. The cloud server of PTL 1 includes: an environment history DB in which room temperature history information that indicates a history of room temperature changes in a room subject to temperature adjustment by an air conditioner is stored by being associated with operation history information that indicates an operation history of the air conditioner; a room environment predicting section that predicts a future room temperature of the room expected in the absence of temperature adjustments by the air conditioner, the future room temperature being predicted as an off-time predicted room temperature by using the room temperature history information and the operation history information; and an air conditioning setting section that, by using the off-time predicted room temperature, decides an air conditioner control parameter used to bring the room temperature of the room to a predetermined target temperature at a predetermined target time.

CITATION LIST

Patent Literature

PTL 1: JP-A-2017-67427

SUMMARY OF INVENTION

Technical Problem

An object of the present invention is to provide a technology that enables more efficient control of an air cleaner by making use of a network.

Solution to Problem

According to a certain aspect of the present invention, an air cleaner is provided that includes:

a communication interface that receives information concerning operation contents from a server; and a processor that, upon partial or complete termination of communication with the server, initializes the information concerning operation contents, or initializes a setting concerning acquisition of the information concerning operation contents.

Advantageous Effects of Invention

The present invention has enabled more efficient control of an air cleaner with the use of a network.

BRIEF DESCRIPTION OF DRAWINGS

FIG. 3 is a schematic diagram representing device management data 121 according to First Embodiment.

FIG. 4 is a schematic diagram representing operation pattern data 122 according to First Embodiment.

FIG. 5 is a schematic diagram representing combination data 123 according to First Embodiment.

FIG. 11 is a block diagram representing a configuration of an air cleaner 200 according to First Embodiment.

FIG. 12 is a schematic diagram representing settings data 221 according to First Embodiment.

FIG. 13 is a schematic diagram representing a control 240 of the air cleaner 200 according to First Embodiment.

FIG. 19 is a schematic diagram representing device management data 121B according to Second Embodiment.

FIG. 22 is a flowchart representing a first information process in a server 100C according to Third Embodiment.

FIG. 23 is a flowchart representing a second information process in the server 100C according to Third Embodiment.

FIG. 24 is a schematic diagram representing regional operation pattern data 124 according to Third Embodiment.

FIG. 30 is a flowchart representing a second information process in the server 100 according to Fourth Embodiment.

FIG. 31 is a schematic diagram representing priorities given to operation patterns according to First Embodiment.

DESCRIPTION OF EMBODIMENTS

Figure 1:
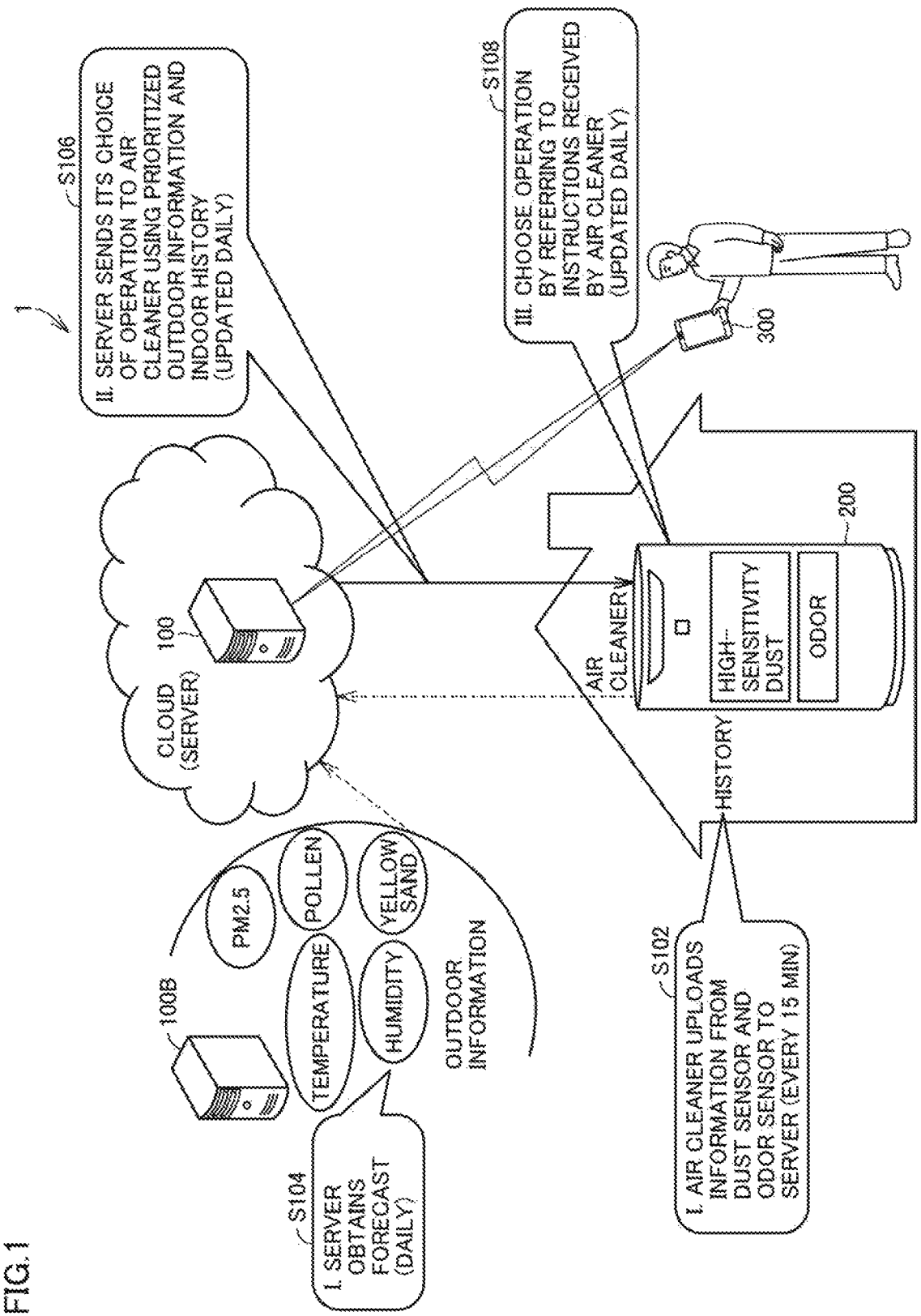
FIG. 1 is a schematic diagram representing an overall configuration of a network system 1 according to First Embodiment, along with a brief overview of its operation.

Embodiments of the present invention are described below with reference to the accompanying drawings. In the following descriptions, like elements are given like reference numerals. Such like elements will be referred to by the same names, and have the same functions. Accordingly, detailed descriptions of such elements will not be repeated.

First Embodiment

Overall Configuration of Network System 1 and Brief Overview of its Operation An overall configuration of a network system 1 according to present embodiment is described below, with reference to FIG. 1. The main components of the network system 1 according to the present embodiment includes a server 100 for controlling home appliances, an information server 100B that handles various types of information, an air cleaner 200 that is connectable to the server 100 via, for example, the Internet and a router, and a communication terminal, such as a smartphone 300, that is connectable to the server 100 via, for example, the Internet and a router.

The air cleaner 200 according to the present embodiment is configured to adjust the sensitivity of sensors that detect dust and odor.

The communication terminal, for example, the smartphone 300, obtains an application program for controlling home appliances such as the air cleaner 200. The present embodiment will be described through the case where the communication terminal is the smartphone 300. However, the communication terminal is not limited to the smartphone 300, and may be a device such as a tablet, a gaming machine, or a personal computer.

The following is a brief overview of the operation of the network system 1 according to the present embodiment. The air cleaner 200 measures the amounts of dust and predetermined gases drawn into the air cleaner 200, using a dust sensor and an odor sensor. The air cleaner 200 sends the measurement results to the home appliances control server 100 (step S102).

The information server 100B obtains information such as weather, air temperature, humidity, pollen levels, and $PM_{2.5}$ levels, and feeds the information to the home appliances control server 100 (step S104).

By using an indoor history representing the result of dust and odor measurement from the air cleaner 200, and outdoor information concerning environmental conditions from the information server 100B, the home appliances control server 100 decides, for example, the optimum operation and the optimum sensitivity on a per-air cleaner 200 basis, and sends the information to the air cleaner 200 (step S106).

By using the information from the home appliances control server 100, the air cleaner 200 changes the operation mode, and sets the sensitivity of each sensor (step S108).

That is, in the present embodiment, the server 100 is able to feed the air cleaner 200 with information suited for the air cleaner 200, using the measured data by the air cleaner 200, and the data from the information server 100B. The following describes the network system 1 with regard to a specific configuration for achieving such a function.

Hardware Configuration of Server 100

Figure 2:
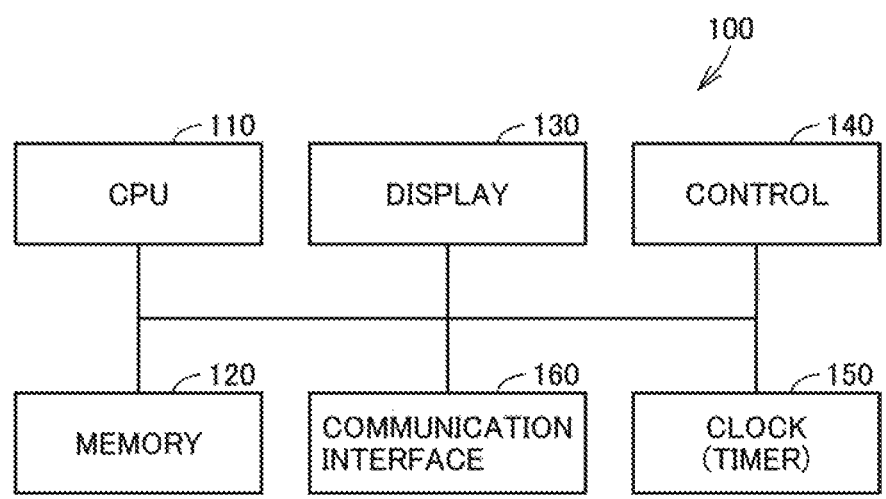
FIG. 2 is a block diagram representing a configuration of a server 100 according to First Embodiment.

An embodiment of a hardware configuration of the server 100 constituting the network system 1 according to the present embodiment is described below, with reference to FIG. 2. The main components of the server 100 include a CPU (Central Processing Unit) 110, a memory 120, a display 130, a control 140, a clock 150, and a communication interface 160.

The CPU 110 controls different parts of the server 100 by executing the programs stored in the memory 120. For example, the CPU 110 runs a program stored in the memory 120, and performs various processes by referring to various data.

The memory 120 is implemented as any of various types of memories, including, for example, RAM (Random Access Memory) and ROM (Read-Only Memory). The memory 120 may be installed in the server 100, or may be detachably provided for the server 100 via various interfaces, or may be a storage medium of a device that is accessible by the server 100. The memory 120 stores, for example, programs to be executed by the CPU 110, data generated by execution of programs by the CPU 110, input data, device management data 121, operation pattern data 122, combination data 123, and database used by home appliances management services according to the present embodiment.

FIG. 3 is a schematic diagram representing the device management data 121 according to the present embodiment. Referring to FIG. 3, the device management data 121 contains, for example, identification information of air cleaner 200, user name of air cleaner 200, identification information of a communication terminal, such as smartphone 300, used for remote control of air cleaner 200, user's postal code, user address, and information indicative of whether to perform the recommended automatic operation provided by the server 100. These information items are associated with one another for each registered air cleaner 200. As expected, the device management data 121 may also contain other types of information, including, for example, the type and model number of air cleaner 200, current instructions, and when to replace filters.

FIG. 4 is a schematic diagram representing the operation pattern data 122. Referring to FIG. 4, the operation pattern data 122 according to the present embodiment contains suited operation modes, and the sensitivity of various sensors, which are associated with one another for each operation pattern.

FIG. 5 is a schematic diagram representing the combination data 123. Referring to FIG. 5, the combination data 123 according to the present embodiment contains suited operation modes, and the sensitivity of various sensors, which are associated with one another for each combination of operation patterns. Here, combinations of three or more operation patterns may be set.

Figure 6:
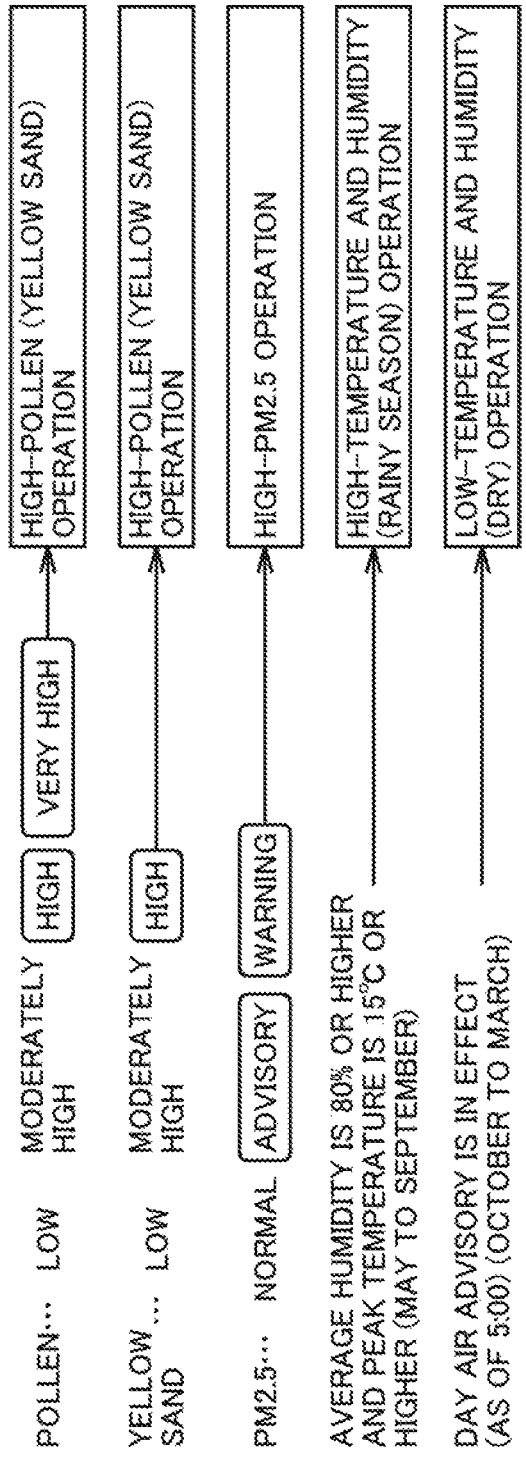
FIG. 6 is a schematic diagram representing how a first operation pattern according to First Embodiment is specified.

Specifically, as shown in FIG. 6, the CPU 110 chooses a first operation pattern, using data from the information server 100B. For example, by using data from the information server 100B, the CPU 110 refers to information regarding pollen in tomorrow's weather forecast, and selects "high-pollen (high-yellow sand) operation" when pollen levels are expected to be "high" or "very high". By using data from the information server 100B, the CPU 110 refers to information regarding yellow sand in tomorrow's weather forecast, and selects "high-pollen (high-yellow sand) operation" when yellow sand levels are expected to be "high". By using data from the information server 100B, the CPU 110 refers to information regarding $PM_{2.5}$ in tomorrow's weather forecast, and selects "high-$PM_{2.5}$ operation" when there is "advisory" or "warning". Between the months of May and September, the CPU 110, by using data from the information server 100B, refers to information regarding humidity and peak temperature in tomorrow's weather forecast, and selects "high-temperature and humidity (rainy season) operation" when the expected average humidity is 80% or higher and the expected peak temperature is 15 degrees or higher, that is, when high temperature and humidity is expected. Between the months of October and March, the CPU 110, by using data from the information server 100B, refers to information regarding humidity and lowest temperature in tomorrow's weather forecast, and selects "low-temperature and humidity (dry) operation" when dry air advisory is issued.

Figure 7:
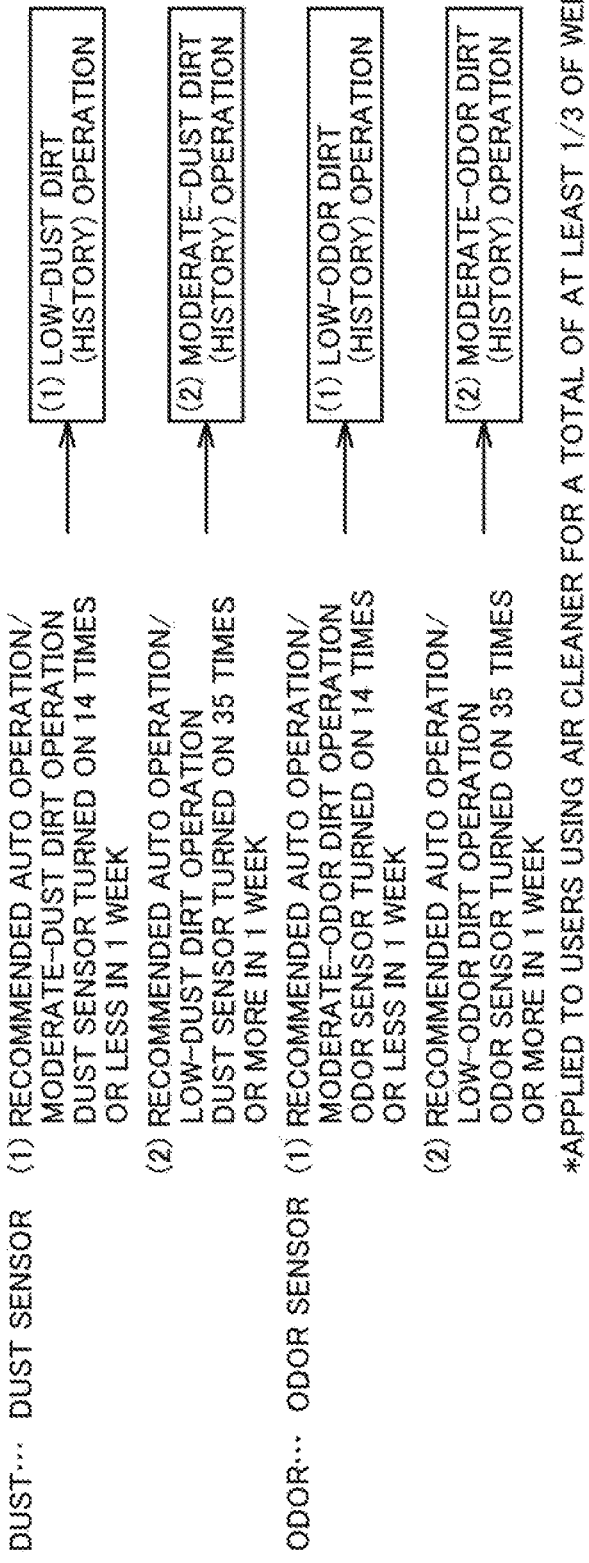
FIG. 7 is a schematic diagram representing how a second operation pattern according to First Embodiment is specified.

Referring to FIG. 7, the CPU 110 chooses a second operation pattern suited for the air cleaner 200, according to how many times the dust sensor of the air cleaner 200 turned on in the last one week. For example, the CPU 110 chooses "low-dust dirt (history) operation" for the air cleaner 200 running in moderate-dust dirt (history) operation mode, when the dust sensor turned on 14 times or less (preferably 10 times or less, more preferably 7 times or less) in the last one week. The CPU 110 chooses "moderate-dust dirt (history) operation" for the air cleaner 200 running in low-dust dirt (history) operation mode, when the dust sensor turned on 35 times or more (preferably 50 times or more, more preferably 70 times or more) in the last one week.

Referring to FIG. 7, the CPU 110 chooses a third operation pattern suited for the air cleaner 200, according to how many times the odor sensor of the air cleaner 200 turned on in the last one week. For example, the CPU 110 chooses "low-odor dirt (history) operation" for the air cleaner 200 running in moderate-odor dirt (history) operation mode, when the odor sensor turned on 14 times or less (preferably 10 times or less, more preferably 7 times or less) in the last one week. The CPU 110 chooses "moderate-odor dirt (history) operation" for the air cleaner 200 running in low-odor dirt (history) operation mode, when the odor sensor turned on 35 times or more (preferably 50 times or more, more preferably 70 times or more) in the last one week.

These settings may be made in the air cleaner 200 itself by the user. The threshold number may be varied by the server 100 according to the season or weather, or may be set by a user in the air cleaner 200 itself.

Figure 8:
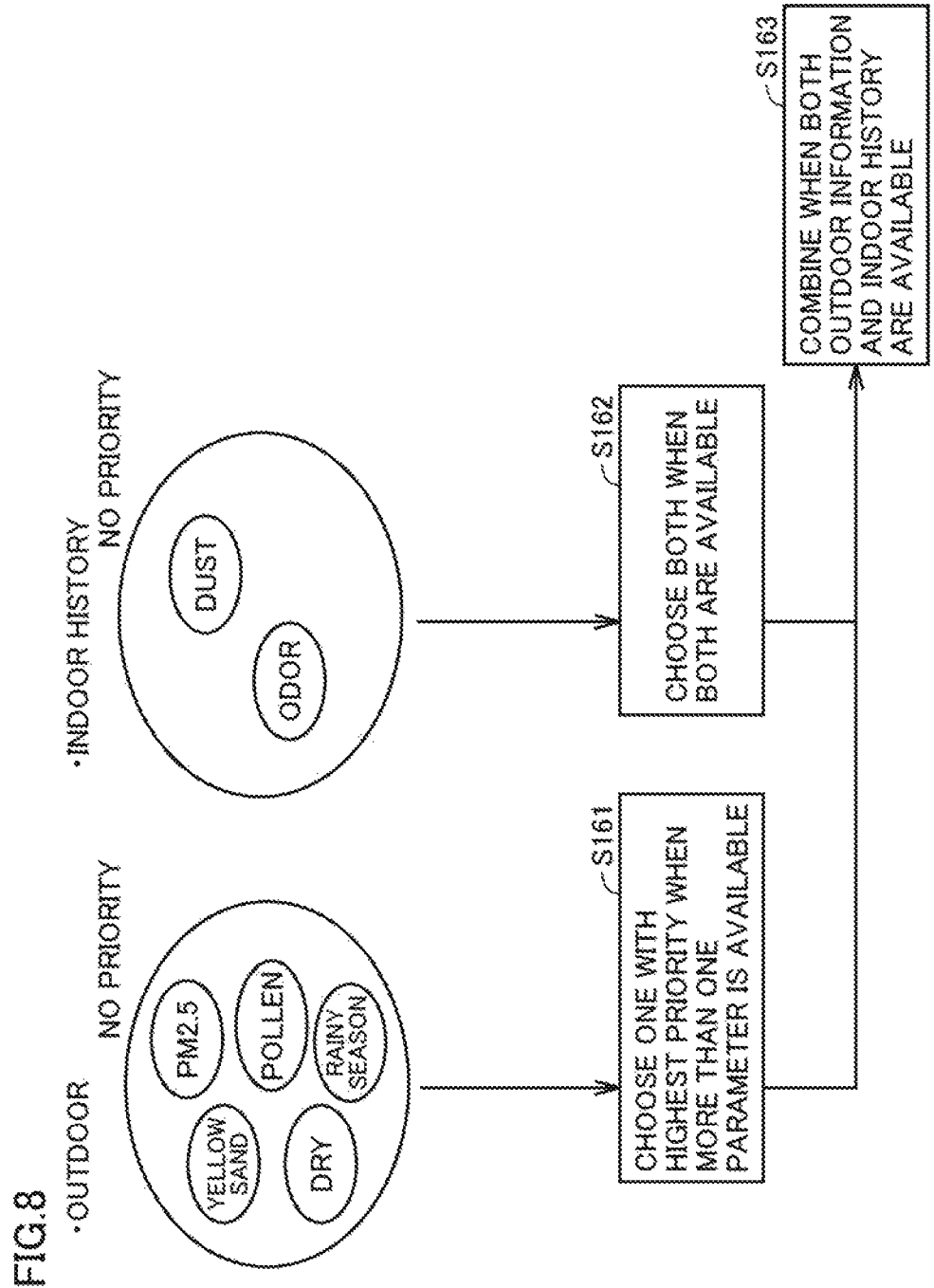
FIG. 8 is a schematic diagram representing a process of when two or more operation patterns according to First Embodiment are available.

In the present embodiment, when the first operation pattern corresponding to environment data is available with the second and third operation patterns corresponding to operation history, the CPU 110 chooses an operation mode and sensitivity using the combination data of FIG. 5 in the manner shown in FIG. 8. When two or more first operation patterns corresponding to two or more environment data are available at the same time, the CPU 110 selects an operation pattern according to priorities, which may be preset, or may be set according to the season, environment, or weather, or may be set by a user, as shown in FIG. 31, for example. Combination data may be prepared also for first operation patterns.

Referring back to FIG. 2, the display 130 displays texts and images based on signals from the CPU 110. The control 140 accepts instructions from, for example, a service administrator, and inputs the instructions to the CPU 110.

The functions of the clock 150 include inputting the current time to the CPU 110, and counting the elapsed time from a designated timing.

The communication interface 160 sends data from the CPU 110 to other devices such as the air cleaner 200 and the smartphone 300 via, for example, the Internet, a carrier network, and a router. The communication interface 160 receives data from other devices such as the air cleaner 200 and the smartphone 300 via, for example, the Internet, a carrier network, and a router, and passes the data to the CPU 110. In the present embodiment, the CPU 110 obtains data concerning operation history from the air cleaner 200, via the communication interface 160, and sends data concerning designated operation modes and designated sensor sensitivity to the air cleaner 200.

Information Process in Server 100

Figure 9:
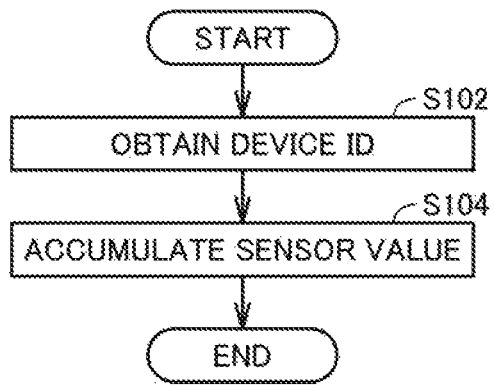
FIG. 9 is a flowchart representing a first information process in the server 100 according to First Embodiment.

The following describes an information process that accumulates indoor history in the server 100 according to the present embodiment, with reference to FIG. 9. The CPU 110 of the server 100 carries out the following processes upon receiving data from the air cleaner 200 via the communication interface 160.

The CPU 110 extracts the ID of the air cleaner 200 from the received data (step S102). From the received data, the CPU 110 obtains information concerning dust and odor detection by the air cleaner 200, for example, such as information indicative of detection of dust and odor, how many times dust and odor were detected, and the amounts and extents of detected dust and odor. The CPU 110 accumulates the information in the memory 120 by associating it with the identification information of the air cleaner 200 (step S104). The server 100 may also accumulate the type, intensity, and duration of operation as history information.

Figure 10:
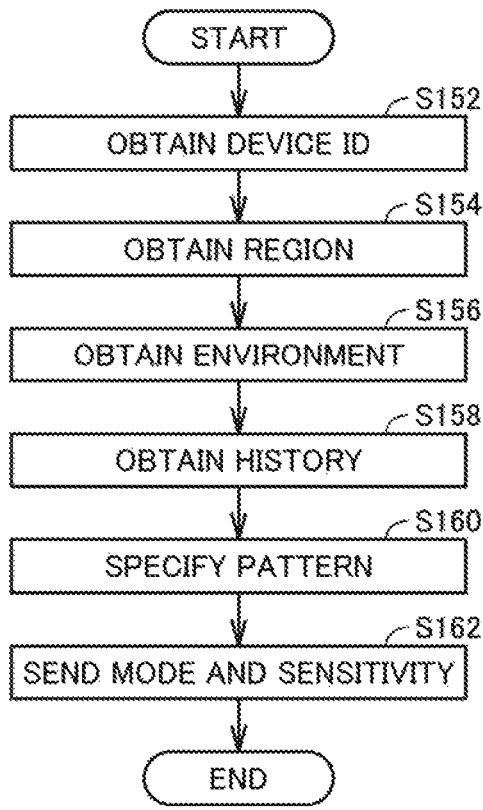
FIG. 10 is a flowchart representing a second information process in the server 100 according to First Embodiment.

The following describes an information process that designates an operation mode in the server 100 according to the present embodiment, with reference to FIG. 10. The CPU 110 of the server 100 carries out the following processes upon receiving data from the air cleaner 200 via the communication interface 160.

The CPU 110 extracts the ID of the air cleaner 200 from the received data (step S152). The CPU 110 refers to the device management data 121, and specifies the region in which the air cleaner 200 is installed (step S154). From the information server 100B, the CPU 110 obtains environment data for the region of the air cleaner 200, via the communication interface 160 (step S156).

The CPU 110 refers to the memory 120, and reads out dust and odor history data concerning the air cleaner 200 (step S158). By using the history data and the environment data of the region, the CPU 110 specifies an operation pattern suited for the air cleaner 200 of interest (step S160). The CPU 110 the sends the operation mode and sensor sensitivity corresponding to the specified operation pattern to the air cleaner 200, via the communication interface 160 (step S162).

Hardware Configuration of Air Cleaner 200

An embodiment of a hardware configuration of the air cleaner 200 constituting the network system 1 is described below, with reference to FIG. 11. The main components of the air cleaner 200 according to the present embodiment include a CPU 210, a memory 220, a display 230, a control 240, a clock (timer) 250, a communication interface 260, sensors such as a dust detection sensor 271 and an odor detection sensor 272, an infrared receiver 280, and a device driving unit 290.

The CPU 210 controls different parts of the air cleaner 200 by executing the programs stored in the memory 220 or in external storage media.

The memory 220 is implemented as any of various types of memories, including, for example, RAM and ROM. The memory 220 may be installed in the air cleaner 200, or may be detachably provided for the air cleaner 200 via various interfaces, or may be a storage medium of a device that is accessible by the air cleaner 200. The memory 220 stores, for example, programs to be executed by the CPU 210, data generated by execution of programs by the CPU 210, input data via the control 240, data received from a remote controller, data received from the server 100 via a router and the Internet, and settings data 221 concerning operation contents.

As shown in FIG. 12, the settings data 221 contains, for example, an operation mode that depends on the operation pattern, and settings for the sensitivity of the dust detection sensor 271 and the odor detection sensor 272. The settings data 221 stored in the memory 220 include initial data pre-contained in the firmware, and data obtained from the server 100 as settings data suited for different operation modes. Specifically, in the memory 220, settings data in the form of initial data, and data obtained from the server 100 as settings data 221 suited for different operation modes may remain even after the power is turned off, whereas setting data 221 obtained from the server 100 may be erased when the power is turned off.

Referring back to FIG. 11, the display 230 outputs texts and images based on signals from the CPU 210. The display 230 may be simply an LED light, for example.

The control 240 is implemented as, for example, buttons or a touch panel. The control 240 accepts instructions from a user, and inputs the instructions to the CPU 210. For example, as shown in FIG. 13, the control 240 according to the present embodiment includes a button 241 used to start/end the recommended automatic operation provided by the server 100, and a button 242 used to set whether to communicate with the server 100. The display 230 and the control 240 may together constitute a touch panel.

The functions of the clock 250 include inputting the current time to the CPU 210, and counting the elapsed time from a designated timing.

The communication interface 260 is implemented as a communication module such as wireless LAN or wired LAN. The communication interface 260 enables data exchange with other devices by means of wired communications or wireless communications. That is, the CPU 210 receives various kinds of information from other devices such as the server 100 via the communication interface 260, and sends various kinds of information to these and other devices via the communication interface 260. In the present embodiment, the CPU 210 sends data concerning dust and Oder to the server 100 via the communication interface 260, and receives information such as operation mode and sensor sensitivity from the server 100.

The dust detection sensor 271 detects dust contained in drawn air, and inputs the detection result to the CPU 210. The odor detection sensor 272 detects a predetermined gas contained in drawn air, and inputs the detection result to the CPU 210.

The infrared receiver 280 detects an infrared signal from, for example, a remote controller, and inputs the signal to the CPU 210. For example, the CPU 210 accepts a power ON/OFF instruction and other control instructions and various kinds of data from a remote controller, via the infrared receiver 280.

The device driving unit 290 controls different parts of the air cleaner 200 (e.g., a motor, a heater), using signals from the CPU 210. For example, in the present embodiment, the CPU 210 accepts instructions concerning modes, air volume, wind direction, and ion generation via the control 240, or from the server 100 via the communication interface 260, and controls the device driving unit 290 using the instructions.

Specifically, in the present embodiment, the CPU 210 varies the threshold number used to determine the presence of dust or odor, using the settings data 221 and the initial data. That is, the CPU 210 varies the threshold number—a threshold for determining the presence of dust and odor—with regard to input signals from the dust detection sensor 271 and the odor detection sensor 272. For example, in a high-sensitivity setting, the CPU 110 determines that dust or odor is present even when the output value is small. Conversely, in a low-sensitivity setting, the CPU 110 does not determine that dust or odor is present unless the output value is moderately large.

Information Process in Air Cleaner 200

Figure 14:
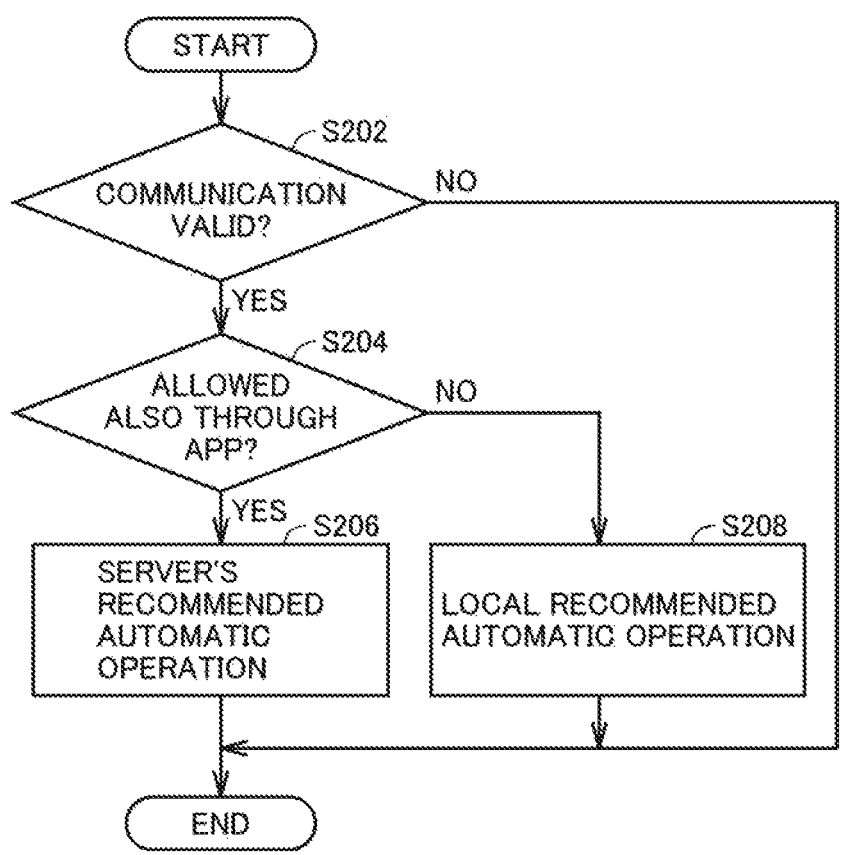
FIG. 14 is a flowchart representing a first information process in the air cleaner 200 according to First Embodiment.

The following describes an information process of when a user of the air cleaner 200 according to the present embodiment enters an instruction to start a recommended automatic operation with the server through the control 240, with reference to FIG. 14.

In response to the user pressing the recommended automatic operation button 241 of the control 240, the CPU 210 of the air cleaner 200 determines whether the air cleaner 200 is validated to communicate with the server 100 (step S202). If the air cleaner 200 is validated to communicate with the server 100 (YES in step S202), the CPU 210 sends an inquiry to the server 100 via the communication interface 260 to find whether the user has allowed a recommended automatic operation, that is, whether the user has allowed a server's recommended automatic operation by entering an instruction to the smartphone 300 through an application (app) (step S204).

In response to the inquiry from the air cleaner 200, the CPU 110 of the server 100 refers to the device management data 121, and determines whether the recommended automatic operation has been allowed for the air cleaner 200. The CPU 110 then sends the result to the air cleaner 200.

In the foregoing example, the information set in the smartphone 300 and indicating whether to allow the recommended automatic operation based on the settings data 221 from the server is stored in the server 100 (step S204). However, the information may be written into the air conditioner 200 via the server 100 upon the server 100 receiving a settings instruction from the smartphone 300 allowing the recommended automatic operation, and the air cleaner 200 may retain the information for the determination made in step S204. The CPU 210 of the air cleaner 200 may initialize the information with the settings data 221 concerning operation contents (FIG. 12) when a reason for initializing the operation contents has occurred, such as in step S264 to be described later. That is, in such an event, the CPU 210 may change the setting to "disallow" with regard to the information indicative of whether to allow or disallow a recommended automatic operation.

Upon receiving a response from the server 100, the CPU 210 of the air cleaner 200 starts the recommended automatic operation with the server 100 (step S206), if the recommended automatic operation has been allowed by the app in the smartphone 300 (YES in step S204).

If the air cleaner 200 is not validated to communicate with the server 100 (NO in step S202), or the user has not allowed the recommended automatic operation through the app in the smartphone 300 (NO in step S204), the CPU 210 locally starts a recommended automatic operation in the air cleaner 200 (step S208).

Figure 15:
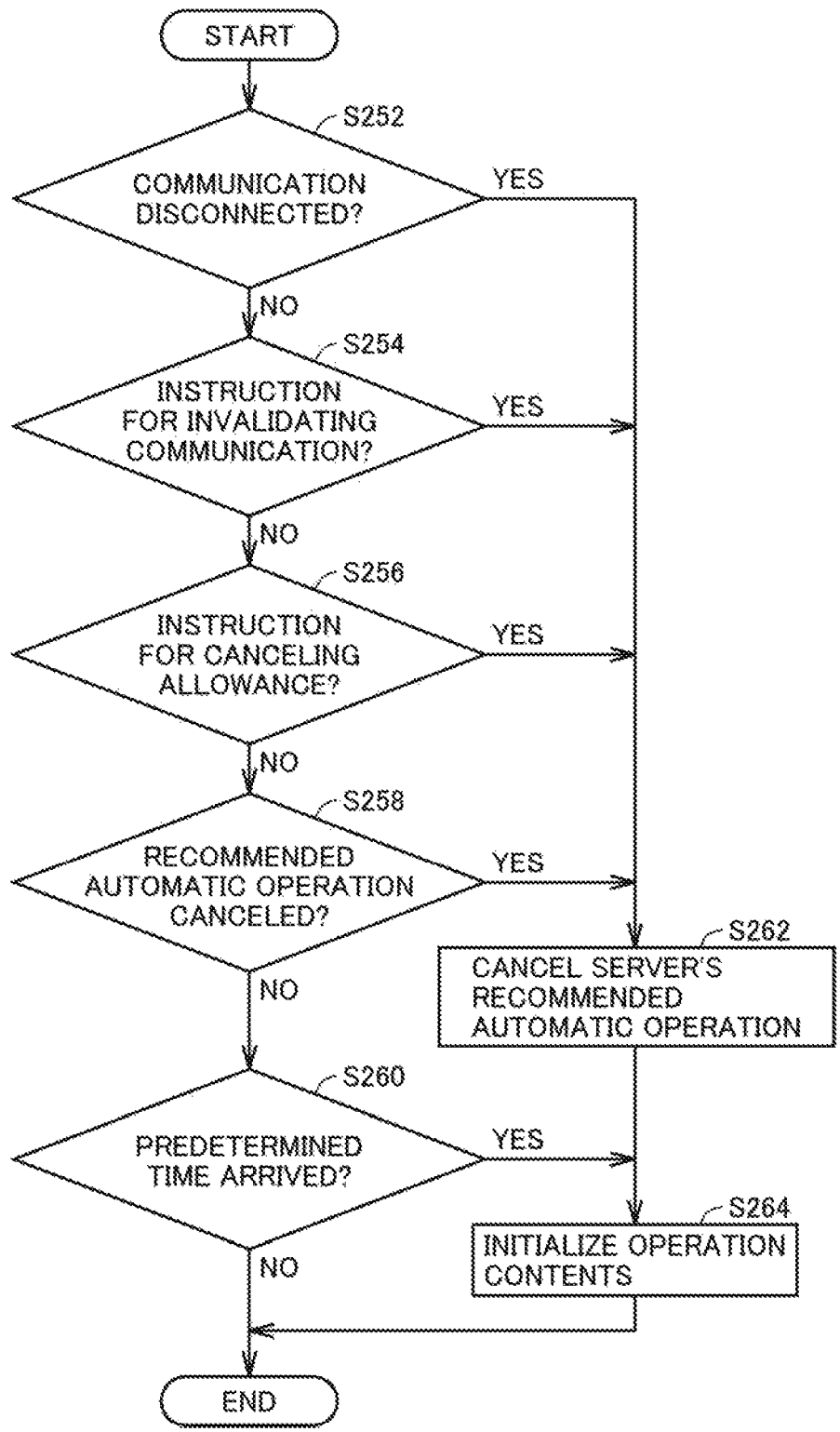
FIG. 15 is a flowchart representing a second information process in the air cleaner 200 according to First Embodiment.

The following describes an information process for the recommended automatic operation performed in the air cleaner 200 according to the present embodiment with the server 100, with reference to FIG. 15. In performing a recommended automatic operation provided by the server 100, the CPU 210 of the air cleaner 200 determines whether communication with the server 100 has been disconnected, on a regular basis via the communication interface 260 (step S252). If communication with the server 100 is not disconnected (NO in step S252), the CPU 210 determines whether the user has entered an instruction to invalidate communication with the server 100 via the control 240 (step S254).

In the absence of an instruction to invalidate communication with the server 100 (NO in step S254), the CPU 210 determines whether the user has entered an instruction to cancel the allowance of recommended automatic operation through the app of the smartphone 300 (step S256). If an instruction to cancel the allowance of recommended automatic operation has not been entered through the app (NO in step S256), the CPU 210 determines whether an instruction to end the recommended automatic operation has been entered via the control 240 (step S258).

In the absence of an instruction to end the recommended automatic operation (NO in step S258), the CPU 210 refers to the clock 250, and determines whether a predetermined time has arrived (step S260). If the predetermined time has not arrived (NO in step S260), the CPU 210 puts itself in standby for the next timing. If the predetermined has arrived, the CPU 210 carries out the process of step S264 (described later).

The CPU 210 ends the communication with the server 100 (step S262), and initializes the operation mode and the sensor sensitivity (step 264) if communication with the server 100 has been disconnected (YES in step S252), or an instruction to invalidate the communication with the server 100 has been entered (YES in step S254), or the user has entered an instruction to cancel the allowance of recommended automatic operation through the app in the smartphone 300 (YES in step S256), or an instruction to end the recommended automatic operation has been accepted via the control 240 (YES in step S258). The CPU 210 then puts itself in standby for the next timing.

More specifically, the CPU 210 may invalidate communication with the server 100 when communication with the server 100 is disconnected (YES in step S252), or when the user has entered an instruction to cancel the allowance of recommended automatic operation through the app in the smartphone 300 (YES in step S256). That is, the CPU 110 may bring itself to a state where the user has entered an instruction to invalidate communication with the server 100 via the button 242 of the control 240.

The settings data 221 concerning operation contents (FIG. 12) may be initialized at the timing when a reason for initializing the operation contents has occurred, such as when, for example, at least one of the following conditions are met:
 the recommended automatic operation is canceled;
 the recommended automatic operation has started;
 the communication was disconnected (not by a user);
 an instruction to invalidate communication is entered (by a user);
 an instruction to cancel the allowance is entered;
 a specified time has arrived;
 other specific instructions are entered; and
 a predetermined error has occurred.

That is, when any of these conditions is met, it is preferable that the air cleaner 200 or the server 100 initialize the settings data 221 concerning operation contents, data indicative of whether to allow or disallow recommended automatic operation, data indicative of whether to exchange data with the server 100, and various other data using the network. In this way, the air cleaner 200 can have a reduced chance of performing an operation that is not suited for the current conditions.

Hardware Configuration of Communication Terminal (Smartphone 300)

Figure 16:
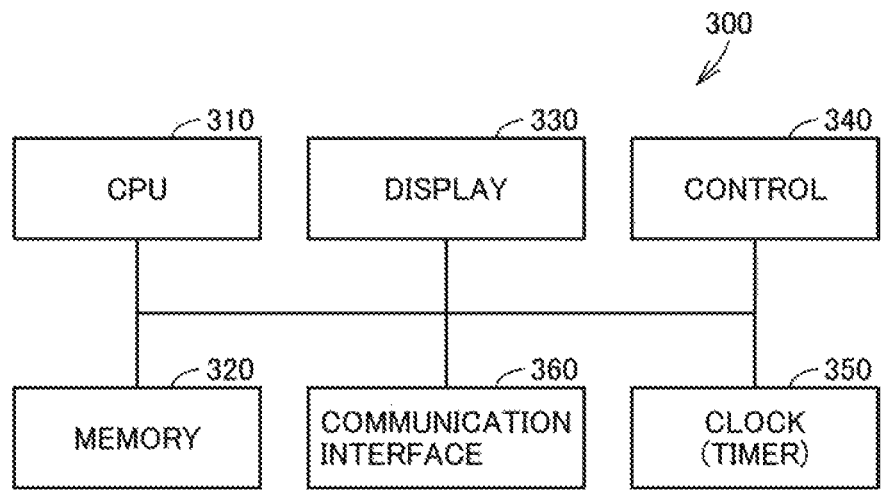
FIG. 16 is a block diagram representing a configuration of a smartphone 300 according to First Embodiment.

An embodiment of a hardware configuration of a communication terminal such as smartphone 300 according to the present embodiment is described below, with reference to FIG. 16. The main components of the smartphone 300 include a CPU 310, a memory 320, a display 330, a control 340, a clock 350, and a communication interface 360.

The CPU 310 controls different parts of the smartphone 300 by executing the programs stored in the memory 320. For example, the CPU 310 executes a program stored in the memory 320, and performs various processes by referring to various data, as will be described below.

The memory 320 is implemented as any of various types of memories, including, for example, RAM and ROM. The memory 320 may be installed in the smartphone 300, or may be detachably provided for the smartphone 300 via various interfaces, or may be a storage medium of a device that is accessible by the smartphone 300. The memory 320 stores, for example, programs to be executed by the CPU 310 (e.g., application programs for controlling home appliances), data generated by execution of programs by the CPU 310, input data via the control 340, and data used by home appliances management services according to the present embodiment.

Figure 17:
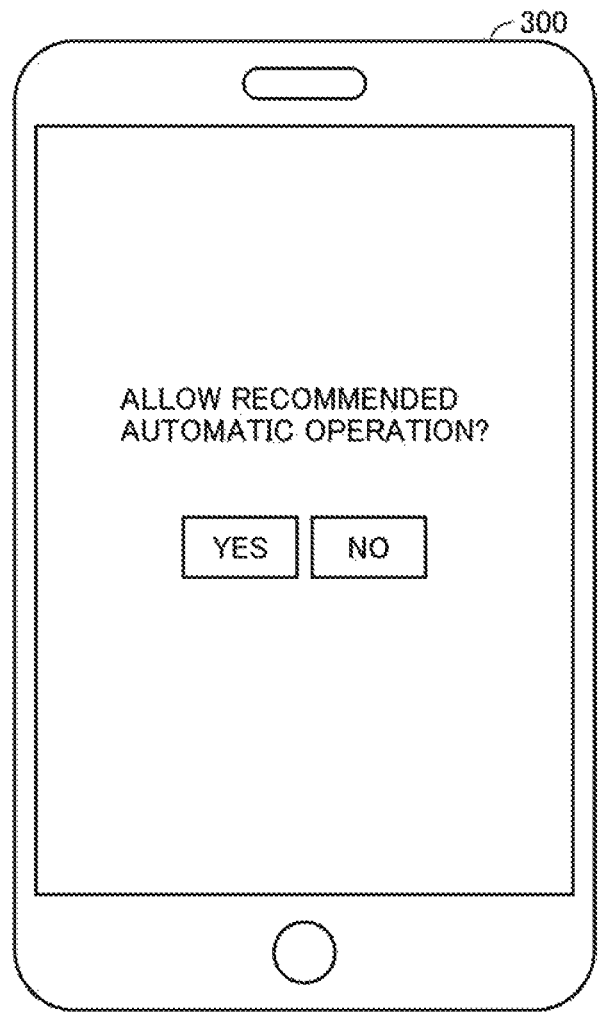
FIG. 17 is a schematic diagram representing a screen of the smartphone 300 according to First Embodiment.

The display 330 displays texts and images based on signals from the CPU 310. The control 340 accepts, for example, user instructions, and inputs the instructions to the CPU 310. The display 330 and the control 340 may together constitute a touch panel. In the present embodiment, the CPU 310, via the touch panel, accepts an instruction to allow or disallow the recommended automatic operation to be performed by the air cleaner 200 with the server 100, as shown in FIG. 17, and sends the instruction to the server 100 via the communication interface 260.

Referring back to FIG. 16, the functions of the clock 350 include inputting the current time to the CPU 310, and counting the elapsed time from a designated timing.

The communication interface 360 sends data from the CPU 310 to other devices such as the server 100 and the air cleaner 200 via, for example, the Internet, a carrier network, and a router. The communication interface 360 receives data from other devices via, for example, the Internet, a carrier network, and a router, and passes the data to the CPU 310. For example, by using an application program for remote control of air cleaner, the CPU 310 causes the display 330 to display a screen for designating whether to accept a remote control instruction, using data received from the server 100 via the communication interface 360, or sends a user instruction to the server 100 via the communication interface 360 after receiving the instruction via the control 340.

Second Embodiment

The present embodiment provides a network system that enables a user to select an operation pattern, an operation mode, and sensor sensitivity as desired by the user. In this way, the air cleaner can have a reduced chance of performing an operation undesired by a user.

Figure 18:
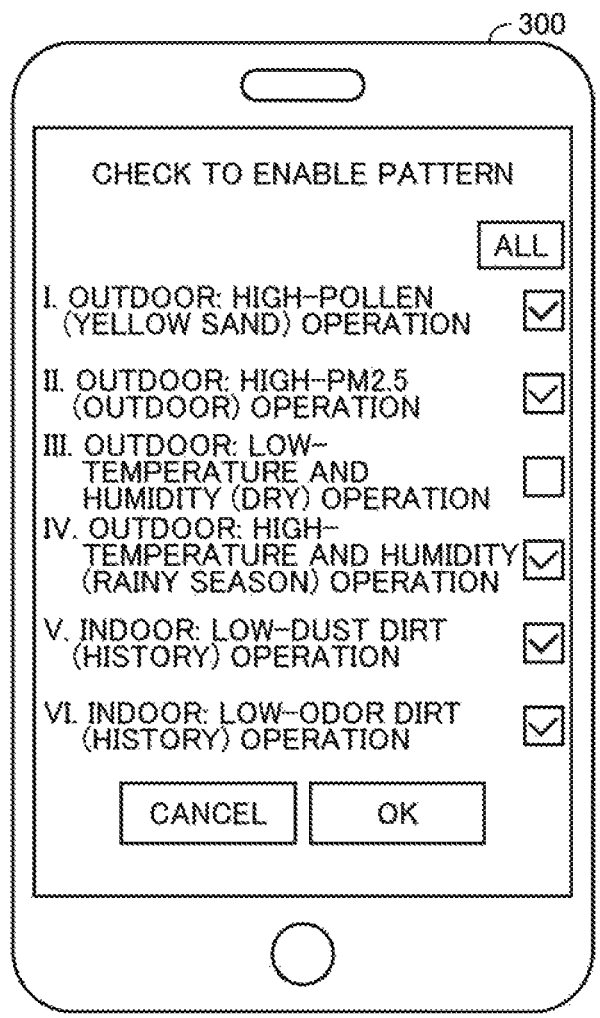
FIG. 18 is a schematic diagram representing a screen of a smartphone 300 according to Second Embodiment.

Specifically, as shown in FIG. 18, the CPU 310 of the smartphone 300 running a downloaded app for managing home appliances delectably displays more than one operation pattern on the display 330, and accepts designation of the operation pattern desired by a user, via the control 340. The smartphone 300 then sends the designation to the server 100.

In the present embodiment, the memory 120 of the server 100 stores the device management data 121B shown in FIG. 19. The device management data 121B according to the present embodiment contains, for example, identification information of air cleaner 200, user name of air cleaner 200, identification information of a communication terminal, such as smartphone 300, used for remote control of air cleaner 200, user's postal code, user address, designation of operation patterns that are selectable at the time of the recommended automatic operation provided by the server 100, and information indicative of whether to perform the recommended automatic operation provided by the server 100. These information items are associated with one another for each air cleaner 200 registered to use the service.

Figure 20:
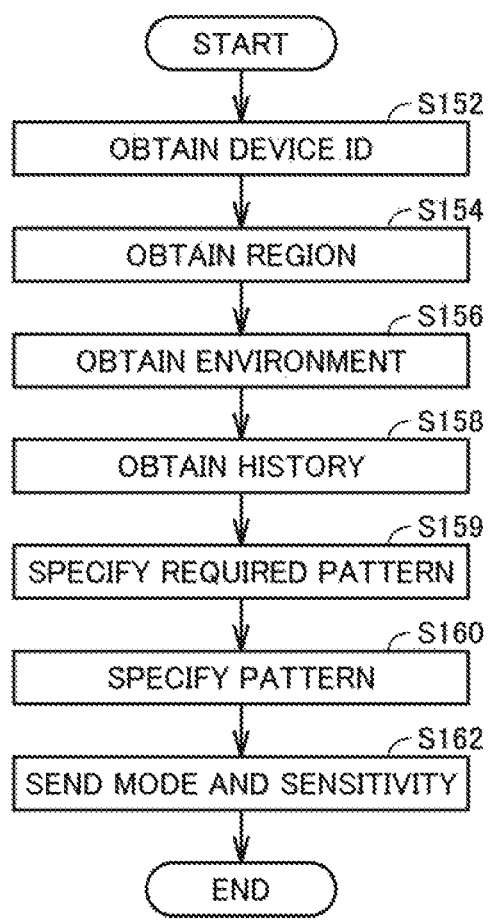
FIG. 20 is a flowchart representing an information process in a server 100 according to Second Embodiment.

With the foregoing configuration, in the present embodiment, the CPU 110 of the server 100 in specifying the operation pattern refers to the device management data 121B, and narrows the operation patterns that are applicable to the air cleaner 200 (step S159), and, by using previous dust and odor history data and regional environment data, specifies the operation pattern that is suited for the air cleaner 200 of interest (step S160), as shown in FIG. 20.

Third Embodiment

In the air cleaners 200 according to First and Second Embodiments, the CPU 210 carries out various processes using the firmware pre-stored in the memory 220. In the air cleaner 200 of Third Embodiment, new firmware is downloaded and installed in response to, for example, an update request from the server 100.

Figure 21:
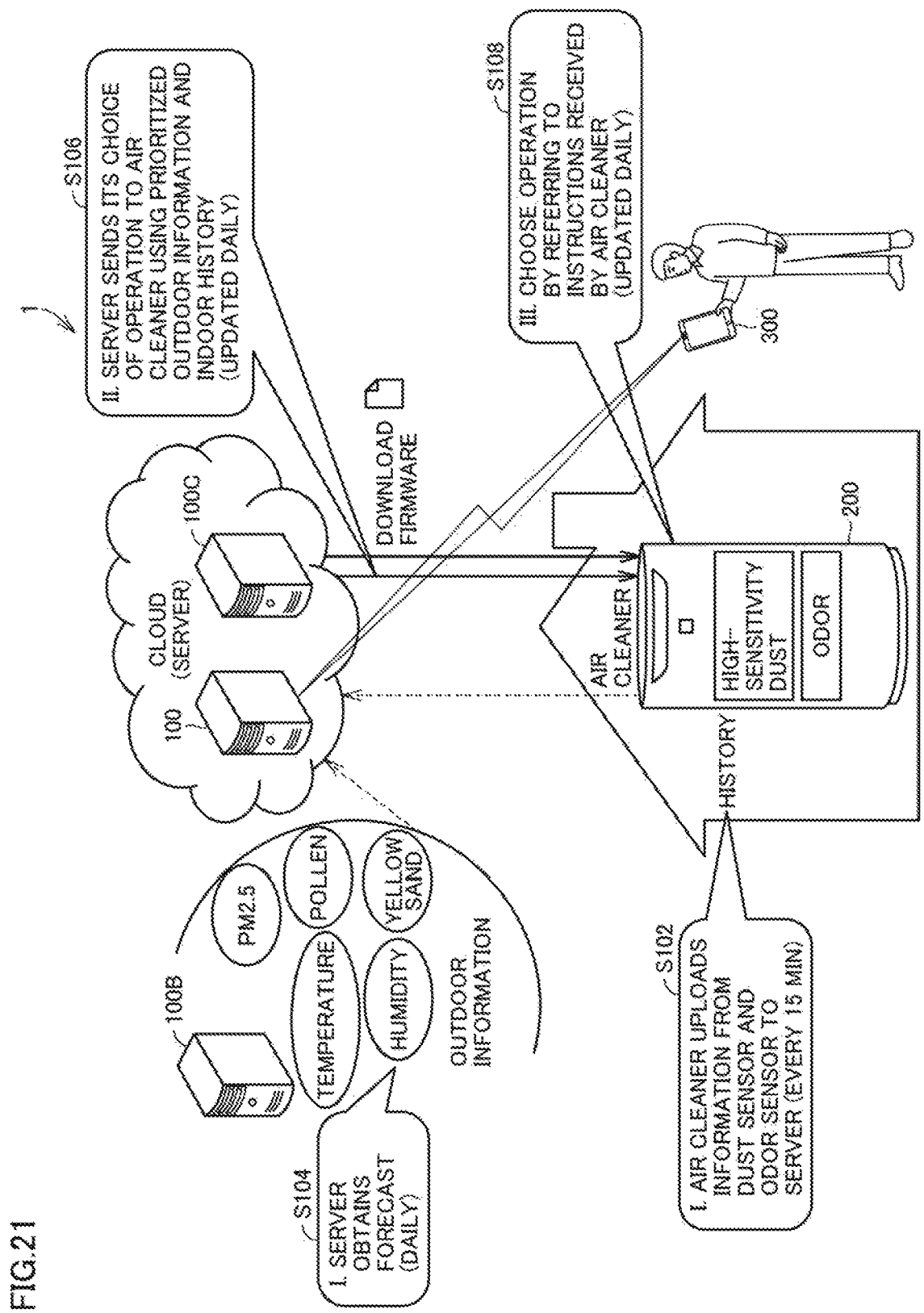
FIG. 21 is a schematic diagram representing an overall configuration of a network system 1 according to Third Embodiment, along with a brief overview of its operation.

Specifically, as shown in FIG. 21, a network system 1 according to the present embodiment includes a firmware-providing server 100C. The server 100C shares the same configuration as the server 100 of First Embodiment represented in FIG. 2, and the same features will not be described again. With the server 100C, the air cleaner 200 is able to update the firmware by obtaining new firmware from the server 100C every time new functions or processes become available for the air cleaner 200. The smartphone 300 is also able to update the app by obtaining a new application program.

In the present embodiment, the server 100C upon registration of new firmware asks a plurality of registered air cleaners 200 to update the firmware, via the communication interface 160. In response to a request for new firmware from the air cleaner 200, the CPU 110 of the server 100C carries out, for example, the process represented in FIG. 22.

Specifically, the CPU 110 reads the device ID of the air cleaner 200 from data from the air cleaners 200 (step S172). The CPU 110 then reads the firmware suited for the type and model number of the air cleaner 200 (step S178), and feeds the firmware to the air cleaner 200 via the communication interface 160 (step S180). In response, the CPU 210 of the air cleaner 200 rewrites the memory 220 using the downloaded new firmware, updating the firmware.

The firmware presented to the air cleaner 200 may be such that the operation patterns and operation modes contained in the firmware are selectable by a user, in the same manner described in Second Embodiment with reference to FIG. 18. In this case, as shown in FIG. 23, the CPU 110, after reading the device ID of the air cleaner 200 from data from the air cleaner 200 (step S172), refers to the device management data 121B stored in the server 100 or in other database, and specifies the operation pattern desired by the air cleaner 200 (step S176). The CPU 110 then assembles firmware containing the operation pattern specified (step S178B), and feeds the firmware to the air cleaner 200 via the communication interface 160 (step S180).

Alternatively, the firmware may contain operation patterns and operation modes that are customized to, for example, the region in which the air cleaner 200 is installed, and the seasonality of the region. In this case, the server 100C is configured to store the regional operation pattern data 124 shown in FIG. 24, or configured to be able to refer to the regional operation pattern data 124. As shown in FIG. 24, the regional operation pattern date 124 contains operation pattern ID, operation pattern contents, and information for specifying the region or season suited for the operation pattern. These items are stored by being associated with one another on a per-operation pattern basis.

Figure 25:
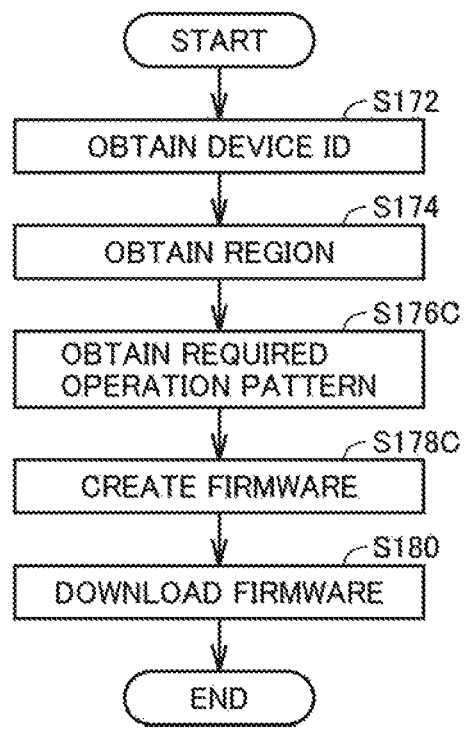
FIG. 25 is a flowchart representing a third information process in the server 100C according to Third Embodiment.

In this case, as shown in FIG. 25, the CPU 110, after reading the device ID of the air cleaner 200 from data from the air cleaner 200 (step S172), refers to the device management data 121 stored in the server 100 or in other database, and specifies the region of the air cleaner 200 (step S174). The CPU 110 then refers to the device management data 121 stored in the server 100 or in other database, and specifies the operation pattern desired by the air cleaner 200 (step S176C). The CPU 110 assembles firmware containing the region of the air cleaner 200 and the operation pattern corresponding to the user's liking (step S178C), and feeds the firmware to the air cleaner 200 via the communication interface 160 (step S180).

Fourth Embodiment

The roles of the devices in the network systems 1 of First to Third Embodiments may be carried out by other devices, either in part or as a whole. Specifically, some or all of the roles of the server 100, the air cleaner 200, and the smartphone 300 may be played by some other device or more than one device, or the roles of the server 100, the air cleaner 200, or the smartphone 300 may be played by any of the server 100, the air cleaner 200, and the smartphone 300, either in part or as a whole.

Figure 26:
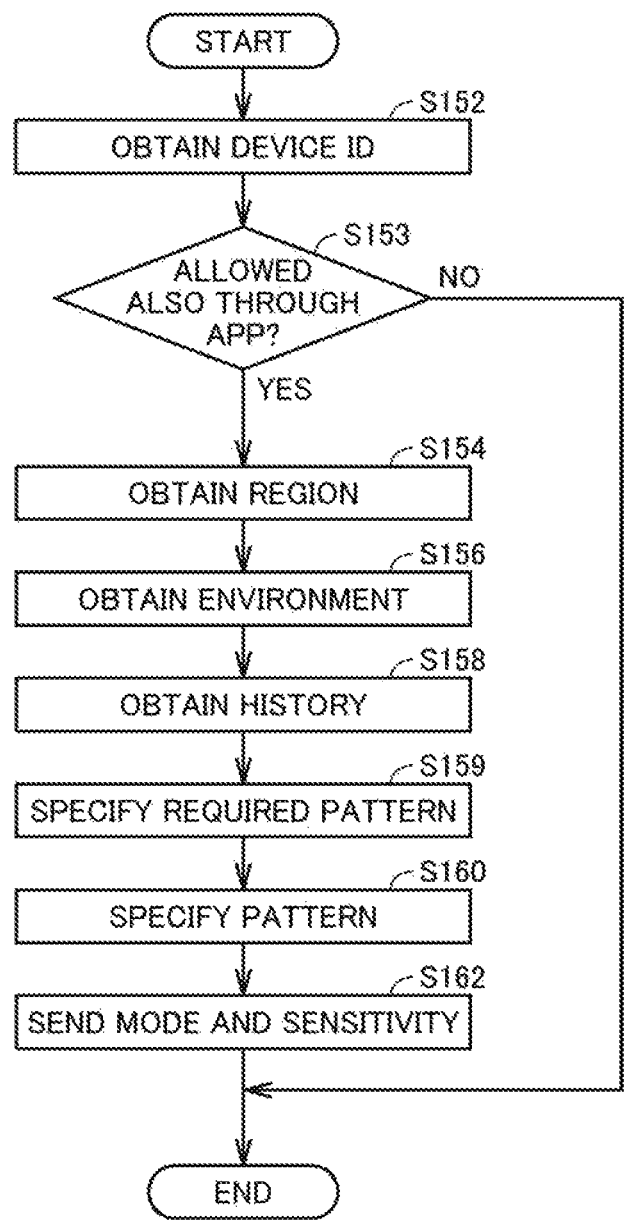
FIG. 26 is a flowchart representing a first information process in a server 100 according to Fourth Embodiment.

For example, in First Embodiment, as shown in FIG. 14, information indicative of whether the user has allowed the recommended automatic operation provided by the server 100 is obtained by the air cleaner 200 from the server 100 (step S204) to decide whether to start the recommended automatic operation provided by the server 100. However, as shown in FIG. 26, the CPU 110 of the server 100 may refer to the device management data 121 after step S152, and determine whether the server's recommended automatic operation has been allowed through the app of the communication terminal corresponding to the air cleaner 200 of interest (step S153). The system also may be adapted so that the CPU 110 performs the processes of S154 and subsequent steps if the recommended automatic operation is allowed (YES in step S153), and does not send the operation mode and sensor sensitivity to the air cleaner 200 if the recommended automatic operation is not allowed (NO in step S153).

Figure 27:
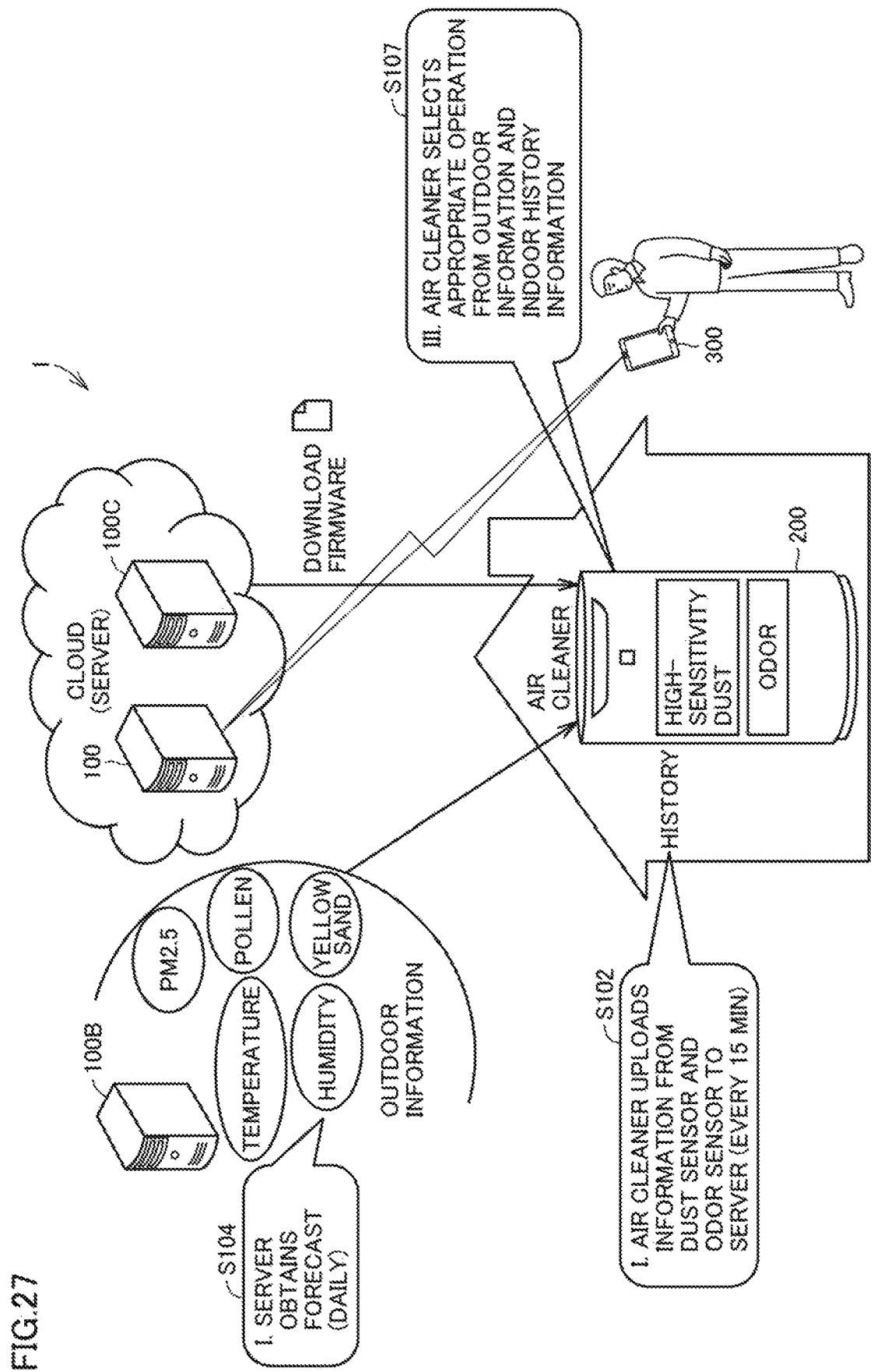
FIG. 27 is a schematic diagram representing an overall configuration of a network system 1 according to Fourth Embodiment, along with a brief overview of its operation.
Figure 28:
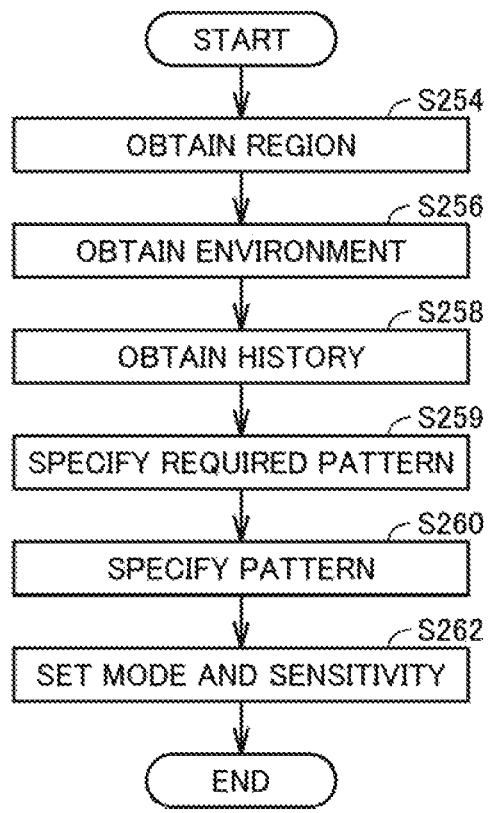
FIG. 28 is a flowchart representing a first information process in an air cleaner 200 according to Fourth Embodiment.

Alternatively, as shown in FIG. 27, the air cleaner 200 may obtain information such as weather forecast from the information server 100B via the Internet, instead of the server 100 obtaining the information. Here, the air cleaner 200 performs the process represented in FIG. 28. Specifically, the CPU 210 of the air cleaner 200 specifies the region in which its air cleaner 200 is installed (step S254). The CPU 210 then obtains environment data of the region of the air cleaner 200 from the information server 100B, via the communication interface 260 (step S256).

The CPU 210 refers to the memory 220, and reads the dust history and odor history concerning the air cleaner 200 (step S258). The CPU 210 specifies the operation pattern suited for the air cleaner 200, using the past dust data and the environment data of the region (step S260). The CPU 110 then resets the operation mode and sensor sensitivity according to the operation pattern specified (step S262). Preferably, the newest programs for carrying out these processes are downloaded to the air cleaner 200 from the server 100C in the form of firmware.

Figure 29:
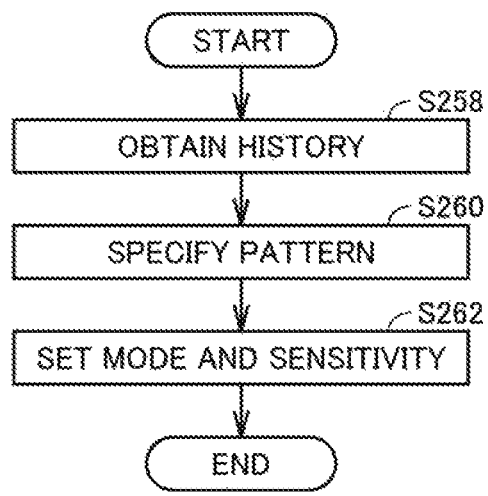
FIG. 29 is a flowchart representing a second information process in the air cleaner 200 according to Fourth Embodiment.

Alternatively, the CPU 210 of the air cleaner 200 may perform the process represented in FIG. 29. Specifically, the CPU 210 of the air cleaner 200 refers to the memory 220, and reads the dust history and odor history concerning the air cleaner 200 (step S258). The CPU 210 specifies the second or third operation pattern suited for the air cleaner 200, using the past dust and odor data (step S260). The CPU 110 then resets the operation mode and sensor sensitivity according to the second or third operation pattern specified (step S262).

Alternatively, the CPU 110 of the server 100 may perform the process represented in FIG. 30. Specifically, the CPU 110 extracts the ID of the air cleaner 200 from the received data (step S152). By referring to the memory 120, the CPU 110 reads the dust history and odor history concerning the air cleaner 200 (step S158). The CPU 110 specifies the second or third operation pattern suited for the air cleaner 200 of interest, using the past dust data (step S160). The CPU 110 then sends the operation mode and sensor sensitivity corresponding to the specified second or third operation pattern to the air cleaner 200 via the communication interface 160 (step S162).

Fifth Embodiment

The foregoing embodiments were described through case of air cleaner 200. However, the technology described above is applicable not only to the air cleaner 200 but to a wide range of air cleaners in the broad sense of the term, including, for example, devices having cooling and heating functions, devices having humidifying functions, devices having dehumidifying functions, and devices having ion generating functions.

Embodiment Summary

The foregoing embodiments provide an air cleaner 200 that includes:

a communication interface 260 that receives information concerning operation contents from a server 100; and a processor 210 that, upon partial or complete termination of communication with the server 100, initializes the information concerning operation contents, or initializes a setting concerning acquisition of the information concerning operation contents.

Preferably, the air cleaner 200 also includes a control 240 that accepts an instruction to accept the information concerning operation contents from the server 100.

The foregoing embodiments provide an air cleaner 200 that includes:

a communication interface 260 that receives information concerning operation contents from a server 100;

a control 240 that accepts designation of whether to accept the information concerning operation contents from the server 100; and a processor 210 that initializes the information concerning operation contents upon accepting designation to reject the information concerning operation contents from the server 100.

Preferably, the processor 210 initializes the information concerning operation contents at a predetermined time.

The foregoing embodiments provide a network system 1 that includes:

a server 100 that sends information concerning operation contents; and an air cleaner 200 that, upon partial or complete termination of communication with the server 100, initializes the information concerning operation contents, or initializes a setting concerning acquisition of the information concerning operation contents.

Preferably, the server 100 accepts designation of whether to accept the information concerning operation contents, on a per-air cleaner 200 basis from the air cleaner 200 and/or other terminal 300.

The foregoing embodiments provide a network system 1 that includes:

a server 100 that sends information concerning operation contents; and an air cleaner 200 that initializes the information concerning operation contents on the basis of designation to reject the information concerning operation contents from the server 100.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the claims set forth below.

REFERENCE SIGNS LIST

1: Network system
100: Home appliances control server
100B: Information server
100C: Firmware-providing server
110: CPU
120: Memory
121: Device management data
121B: Device management data
122: Operation pattern data
123: Combination data
124: Regional operation pattern data
130: Display
140: Control
150: Clock
160: Communication interface
200: Air cleaner
210: CPU
220: Memory
221: Settings data
230: Display
240: Control
241: Button
242: Button
250: Clock
260: Communication interface
264: Step
271: Dust detection sensor
272: Odor detection sensor
280: Infrared receiver
290: Device driving unit 300: Smartphone
310: CPU
320: Memory
330: Display
340: Control
350: Clock
360: Communication interface

The invention claimed is:

1. An air cleaner comprising:
a sensor that outputs a value related to a condition of air drawn into the air cleaner:
a communication interface that receives operation information of the air cleaner from a server;
one or more non-transitory computer-readable memory having computer-executable instructions embodied thereon; and
a processor coupled to the one or more non-transitory computer-readable emory that executes instructions to;
upon receiving the operation information from the server, alter a threshold number to be compared with the value based on the operation information: and
upon partial or complete termination of communication with the server, initialize the threshold number, or initialize a setting concerning acquisition of the operation information.

2. The air cleaner according to claim 1, further comprising a controller that accepts an instruction to accept the operation information from the server.

3. An air cleaner comprising:
a sensor that outputs a value related to a condition of air drawn into the air cleaner:
a communication interface that receives operation information of the air cleaner from a server;
a controller that accepts designation of whether to accept the operation information from the server;
one or more non-transitory computer-readable memory having computer-executable instructions embodied thereon; and
a processor coupled to the one or more non-transitory computer-readable memory that executes an instruction to, initialize a threshold number to be compared with the value upon accepting designation to reject the operation information from the server.

4. The air cleaner according to claim 1, wherein the processor initializes the operation information at a predetermined time.

5. A network system comprising:
a server; and
an air cleaner including:
a sensor that outputs a value related to a condition of air drawn into the air cleaner;
a communication interface that receives operation information of the air cleaner from the server; and
a processor coupled to the one or more non-transitory computer-readable memory that executes instructions to:
upon receiving the operation information from the server, alter a threshold number to be compared with the value based on the operation information; and
upon partial or complete termination of communication with the server, initialize the threshold number, or initialize a setting concerning acquisition of the operation information.

6. The network system according to claim 5, wherein the server accepts designation of whether to accept the operation information, from the air cleaner and/or an other terminal.

7. A network system comprising:
a server; and
an air cleaner including:
a sensor that outputs a value related to a condition of air drawn into the air cleaner
a communication interface that receives operation information of the air cleaner from the server; and
a processor coupled to the one or more non-transitory computer-readable memory that initialize a threshold number to be compared with the value on the basis of designation to reject the operation information from the server.

8. The air cleaner according to claim 1, the sensor is a dust sensor, and the threshold number indicates presence of dust in the air.

9. The air cleaner according to claim 1, the sensor is an odor sensor, and the threshold number indicates presence of odor in the air.

10. The air cleaner according to claim 2, the controller further accepts an instruction of transition to an automatic operation, and
the processor further executes instructions to:
upon accepting instruction of transition to the automatic operation, allow starting the automatic operation provided by the server; and
upon partial or complete termination of communication with the server, cancel allowance of the automatic operation.

* * * * *